US012177225B2

(12) United States Patent
Price et al.

(10) Patent No.: US 12,177,225 B2
(45) Date of Patent: Dec. 24, 2024

(54) SHARED CONTENT PRIVILEGE MODIFICATION

(71) Applicant: International Business Machines Corporation, Armonk, NY (US)

(72) Inventors: Dana L. Price, Surf City, NC (US); Heather Saunders, Raleigh, NC (US); Kelly Camus, Durham, NC (US); Melanie Dauber, Oceanside, NY (US)

(73) Assignee: International Business Machines Corporation, Armonk, NY (US)

(*) Notice: Subject to any disclaimer, the term of this patent is extended or adjusted under 35 U.S.C. 154(b) by 281 days.

(21) Appl. No.: 17/223,112

(22) Filed: Apr. 6, 2021

(65) Prior Publication Data
US 2022/0321570 A1  Oct. 6, 2022

(51) Int. Cl.
*H04L 29/06* (2006.01)
*H04L 9/40* (2022.01)
*H04L 51/212* (2022.01)
*G06F 40/20* (2020.01)

(52) U.S. Cl.
CPC .......... *H04L 63/105* (2013.01); *H04L 51/212* (2022.05); *G06F 40/20* (2020.01)

(58) Field of Classification Search
CPC ..... H04L 63/105; H04L 51/212; H04L 63/10; G06F 40/20; G06F 21/6218; G06F 21/62
See application file for complete search history.

(56) References Cited

U.S. PATENT DOCUMENTS

| 8,024,361 | B2* | 9/2011 | Daughtry ............ G06F 21/604 |
| | | | 707/786 |
| 9,122,751 | B2 | 9/2015 | Chen et al. |
| 9,449,182 | B1 | 9/2016 | Dang et al. |
| 9,508,055 | B1 | 11/2016 | Webb et al. |
| 10,061,929 | B2 | 8/2018 | Gaudet et al. |
| 10,194,293 | B2 | 1/2019 | Johnson et al. |
| 10,210,274 | B2 | 2/2019 | Albouyeh et al. |
| 10,491,653 | B2 | 11/2019 | Ferdowsi et al. |
| 10,657,195 | B2 | 5/2020 | Stone et al. |

(Continued)

FOREIGN PATENT DOCUMENTS

KR  102005458 B1  10/2019

OTHER PUBLICATIONS

Wrzeszcz et al., "Effective and Scalable Data Access Control in Onedata Large Scale Distributed Virtual File System", International Conference on Computational Science, ICCS 2017, Jun. 2017, Science Direct, 10 pages.

(Continued)

*Primary Examiner* — Yogesh Paliwal
(74) *Attorney, Agent, or Firm* — Scott S. Dobson

(57) ABSTRACT

Shared content privilege modification is provided. An electronic message is identified containing an address for accessing shared content, where the message is for communication to a set of recipients. Existing privileges are determined for the shared content for each recipient in the set of recipients. A requested action regarding the shared content is determined by analyzing the communication using natural language processing. Privileges for the shared content are modified for at least one recipient based on the existing privileges for the at least one recipient being insufficient to perform the requested action.

17 Claims, 3 Drawing Sheets

(56) References Cited

U.S. PATENT DOCUMENTS

| | | | |
|---|---|---|---|
| 10,740,482 B2 | 8/2020 | Kulkarni et al. | |
| 10,909,256 B1* | 2/2021 | Fritz | G06F 3/0481 |
| 2002/0120757 A1 | 8/2002 | Sutherland et al. | |
| 2008/0033955 A1* | 2/2008 | Fujii | G06F 21/6218 |
| | | | 707/999.009 |
| 2009/0282493 A1* | 11/2009 | Bhide | H04L 51/00 |
| | | | 726/28 |
| 2011/0161449 A1* | 6/2011 | Callanan | H04L 51/046 |
| | | | 709/206 |
| 2012/0179759 A1* | 7/2012 | Li | H04L 12/6418 |
| | | | 709/205 |
| 2015/0154156 A1 | 6/2015 | Meyers et al. | |
| 2015/0261974 A1 | 9/2015 | Kirigin et al. | |
| 2016/0127296 A1 | 5/2016 | Wang et al. | |
| 2018/0046816 A1* | 2/2018 | Chanda | G06F 21/6209 |
| 2019/0220489 A1 | 7/2019 | Hewitt et al. | |
| 2020/0099667 A1* | 3/2020 | Parthasarathy | G06F 21/6218 |
| 2020/0410170 A1* | 12/2020 | Good | G06F 40/295 |
| 2022/0207483 A1* | 6/2022 | Agarwal | H04L 51/42 |

OTHER PUBLICATIONS

Whalen et al., "File Sharing and Group Information Management", Dalhousie University, printed Jan. 20, 2021, 8 pages.
Vinjumur et al., "Finding the Privileged Few: Supporting Privilege Review for E-Discovery", ASIST 2015, Nov. 6-10, 2015, St. Louis, MO, USA, 4 pages.
Julia et al., "For Some Eyes Only: Protecting Online Information Sharing", Research Collection, 2012, ETH Zurich, 13 pages.
Kadry, "A New Security Paradigm of File Sharing", IJCSI International Journal of Computer Science Issues, vol. 7, Issue 6, Nov. 2010, 17 pages.

\* cited by examiner

SHARED CONTENT PRIVILEGE MODIFICATION

BACKGROUND

The present disclosure relates to content sharing, and more specifically, to data security for shared content.

Shared content management services allow an owner of content to share their content with other users. The service may provide uniform resource locators (URLs) for users to access content. The shared content management services allow users to perform different actions with respect to the content based on their assigned privileges. The owner of the content may assign different privileges to each user. For example, some users may only have read privileges while some users may have read and write privileges. Other users may not have any privileges with regards the content and may not be able access the content at all.

SUMMARY

According to embodiments of the present disclosure, a method is provided. The method includes identifying an address for accessing shared content, where the message is for communication to a set of recipients. Existing privileges are determined for the shared content for each recipient in the set of recipients. A requested action regarding the shared content is determined. Privileges for the shared content are modified for at least one recipient based on the existing privileges for the at least one recipient being insufficient to perform the requested action.

Further embodiments provide a system and a computer program product for performing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
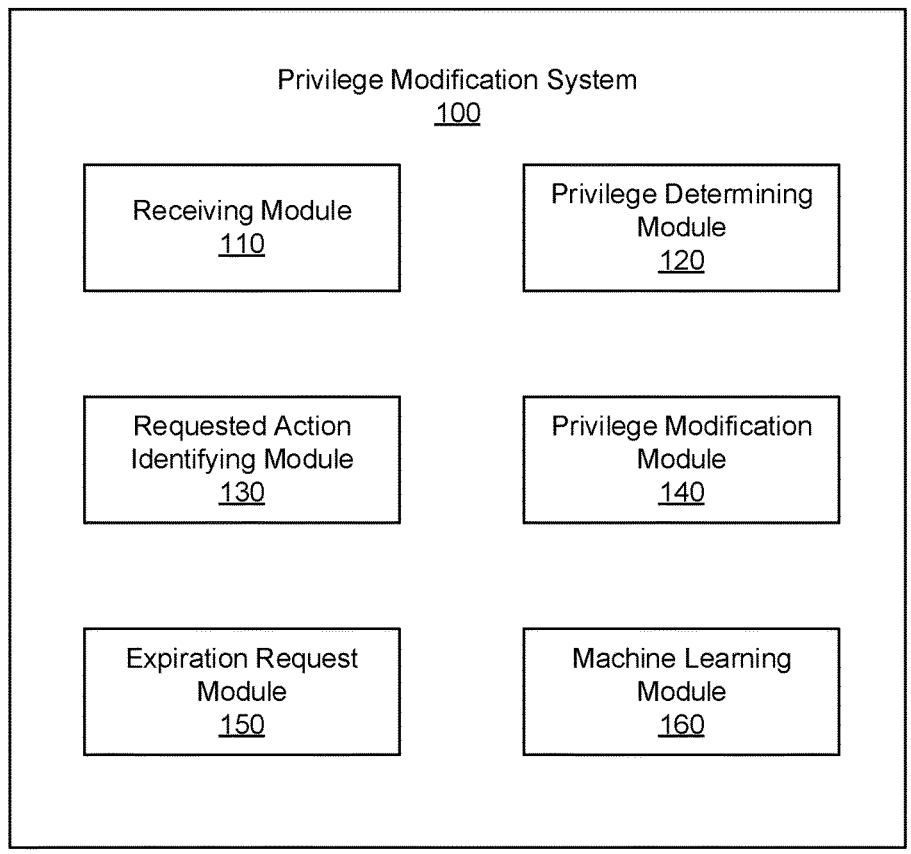
FIG. 1 depicts a shared content privilege modification system, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to user privileges for shared content, and more particular aspects relate to modifying privileges for shared content. While the present disclosure is not necessarily limited to such applications, various aspects of the disclosure may be appreciated through a discussion of various examples using this context.

Commonly, a user will send a message to other users with instructions to take an action with regards to shared content and include a uniform resource locator (URL) for accessing the shared content. For example, a user may send an email requesting that the recipients review and edit a shared document, and the email may provide a URL link for accessing the shared document. However, often the sender will assume that other users have the required privileges to take the action without knowing or checking the existing privileges. When a user does not have the required privileges to perform the action, they must respond to the sender to request a change in their privileges for the shared content. Further, the sender may not have the ability to change the existing privileges for the shared content and may need to contact an owner of the content to have the privileges changed. This may cause a delay in the ability of the user to perform the requested action and may cause frustration.

To prevent this delay and frustration, prior to sharing URLs, owners of content may grant privileges to users that are unnecessary. For example, the owners may grant privileges to users or groups that do not need any privileges for the shared content, may grant additional privileges to users that do not require them, and may grant privileges to users for an indefinite period of time when a more tailored time period would be sufficient. This may cause unnecessary security concerns for the shared content.

Embodiments of the present disclosure provide a system for privilege modification for shared content based on an electronic message containing an address for accessing shared content. The system may receive a message for communication to a set of recipients that contains an address for accessing shared content. The system may determine the recipient's current privileges for the shared content. The system may analyze the message using natural language processing to identify an action requested of the recipients regarding the shared content. The system may modify the privileges for a recipient of the message if the current privileges are insufficient to perform the requested action.

In some embodiments, the system does not analyze the message to identify an action. In these embodiments, the system may modify privileges for a recipient of the message to provide read access to the shared content if the recipient does not have read access to the shared content.

As used herein, shared content may be any electronic content that can be accessed via one or more networks by different users. Shared content includes, but is not limited to, documents, spreadsheets, videos, and images. Users may be able to read, download, modify, delete, replace with a new version, reshare, etc., the shared content depending on the shared content management service. Further, the shared content management service may restrict the ability of specific users or groups to perform these actions based on privileges assigned to the users or groups. Specific privileges may provide the ability to perform one or more actions with regards to shared content.

As used herein an electronic message may be a message through any form of electronic communication. Electronic messages include, but are not limited to, emails, texts, instant messages, channel-based messages, chat messages, and shared documents.

A system may be configured to perform one or more of the operations described herein. In some embodiments, an electronic communication program installed on a user's computing system may be configured to perform one or more of the operations described herein. For example, an email client or a shared content management client, may be configured to perform one or more of the operations. In some embodiments, one or more of the operations are implemented using a plugin on a user's computing system. The plugin may provide additional functionality to a program on a user's computer. For example, one or more operations described herein may be performed by a plugin for an electronic communication program such as an email client. In some embodiments, one or more of the operations described herein may be performed by a server or a cloud computing environment. For example, one or more operations may be performed by a server or cloud computing environment that provides for the communication of electronic messages.

In some embodiments, the electronic communication program and the shared content management service may be fully integrated by a single provider. In these embodiments, a system may be able to fully effectuate each step of the privilege modification process described herein. In other embodiments, the system may need to send requests to another system to perform one or more operations.

In some embodiments, the system may receive the electronic message when a user initiates communication of the message. For example, initiating communication of the message may include a user clicking a button in their email client to send an email, a user clicking a button to post a message in a channel, or a user clicking a save button on a shared document. In some embodiments, the system may receive the electronic message from a client computing system to communicate the message to others. For example, the system may be part of an email service provider and receive an email from a first user to send to other users.

In some embodiments, the system may intercept the message. As used herein, intercepting the message includes preventing the message from being communicated while one or more actions are performed. For example, when a user clicks the "send" button to send an email, the email client may stop the email from being sent while the system determines whether user privileges should be modified based on the email. In some embodiments, the system does not intercept the message and performs one or more of the operations to modify privileges after, or in parallel with, communication of the message (i.e., the message is communicated as normal while the system determines whether user privileges should be modified).

After an electronic message has been received, the system may determine if the message contains an address for accessing shared content. The address may be contained within a link in the message. In some embodiments, the address is a URL. The system may be configured to identify certain parts of an address to determine if the address directs a user to shared content. For example, the system may be configured to identify a URL as a URL for accessing shared content based on the hostname and/or other aspects of the URL.

After the system determines that the message contains an address for accessing shared content, the system may determine the existing privileges for the recipients of the message. The system may obtain the existing privileges for each of the recipients from the shared content management service. In some embodiments, the system may use browser access to obtain data from the shared content management service over the web. In some embodiments, the system requests privileges for each user using an application programming interface (API).

In some embodiments, the system may use the same identifier for the user as used for the communication. For example, a recipient's email address may also be the user identifier for the user on the shared content management service.

In some embodiments, the system may perform entity resolution to identify a corresponding identifier used by the shared content management service (i.e., the identifier used for the communication may be used to determine a corresponding identifier for the shared content management service). For example, if the shared content management service uses single sign-on, the system may use an API to obtain a username for a recipient from the single sign-on provider using the recipients contact information. In some embodiments, the system and the shared content management service may share a common registry, such that the system may identify the user using the common registry. In some embodiments, a public registry may be used to determine the appropriate identifier. For example, an email address may be used to identify an entity in a public registry that contains an identifier for the shared content management service.

The system may analyze the message using natural language processing (NLP) to determine whether the message requests that the recipients to take an action with regards to the shared content. For example, the message could contain statements such as "Feel free to add items", "Please update", or "Can you add details to the top section?". The system may determine that each of these example statements requests that the recipient edit the shared content. Alternatively, the message could contain statements such as "Did you see this?" or "Please read." The system may determine that each of these example statements require that the recipient can view the shared content. Other requested actions may include download, delete, replace with a new version, reshare, or any other action allowed by the shared content management service.

The system may then determine whether the existing privileges for each of the recipients are sufficient for the recipients to perform the requested actions. To compare the existing privileges with the requested actions, the system may need to correlate the requested action with a privilege in the shared content management service. In some embodiments, the NLP processing may be configured to tag the requested actions with the corresponding privileges needed. In some embodiments, the system may determine a corresponding privilege that is required for each requested action. For example, the system may store a table with actions and corresponding privileges and use the table to identify a privilege corresponding to a requested action.

The system may modify the privileges if they are not sufficient to perform the requested action. The system may be configured to modify the privileges using an API. In some embodiments, the system may notify the sender when the privileges are insufficient and prompt the user to approve modifying the privileges before performing the modification.

If the sender does not have permission to modify the privileges for the shared content, the system may be configured to request permission from a user that is able to give access. In some embodiments, the system may identify one or more owners of the shared content and request permission to modify the privileges. For example, the system may identify an owner from a user list and prompt the owner to approve or disapprove the privilege modification. In some embodiments, the system may request a privilege modification from the shared content management service and the shared content management service may contact one or more owners to approve the privilege modification.

In some embodiments, the system may further identify time limitations with respect to the requested actions. The time limitation may correspond to a starting time for the modified privileges and/or an end time for the modified privileges. For example, the message could contain a statement such as "Please handle this week" or "Don't share this before Tuesday." When the system identifies a time limitation corresponding to the requested action, the system may determine a corresponding start time and/or end time for the change in privileges for the shared content. In some embodiments, the system may simply use the period of time identified in the message. In some embodiments, the period of time identified in the message may be changed by a predetermined amount. For example, if the message requests that participants edit a shared document by Tuesday, the system may be configured to have the period of time to expire on Wednesday.

In some embodiments, the system may send an instruction to the shared content management service to modify the privileges at the start time and revert the privileges back to the existing privileges at the end time. For example, the system may instruct the shared content management service to modify the privileges at a specified time and include an expiration for the modified privileges. In some embodiments, the system may schedule a time for the system to modify the privileges. For example, the system may schedule a start time when the system will modify privileges through an API and the system may schedule an end time when the system will revert the privileges back to the existing privileges through the API.

In some embodiments, when a user attempts to perform an action that requires the modified privileges after the modification of privileges have expired, a request may be communicated to the sender to approve another modification of the privileges. For example, an initial email from the sender may request that the recipients provide their edits on a shared document by Tuesday. The system may modify the privileges to allow for editing and have the privileges expire on Tuesday. A recipient that tries to edit the document on Wednesday may initiate a request to the sender to modify the privileges to allow editing for the recipient.

In some embodiments, the predetermined amount for changing the period of time identified in a message may be determined using machine learning. The system may store historical information relating to the privilege modification, requests for modified privileges after the privileges have expired, and the results of the request. Based on this information, the system may determine appropriate changes to the period of time identified in the message. For example, if a sender consistently receives requests for modified privileges after the modification of privileges has expired and the sender consistently approves the requests, the system may learn to automatically approve an extension of the period of time. In some embodiments, the system may learn to modify the amount of the extension of the period of time based on the type of shared content and/or the recipients.

In some embodiments, the modification of privileges for a first shared content based on an initial electronic communication may cause the modification of privileges for a second shared content. For example, where the first shared content is a shared document that contains instructions to perform an action with regards to a second shared content and the privileges are modified to provide read access to additional users for the shared document, the system may perform the privilege modification operations for the additional users regarding the second shared content using the shared document as the electronic communication (i.e., the system may identify the existing privileges for the additional users with regards to the second shared content, identify the requested actions in the shared document with regards to the second shared content, and modify privileges for each of the additional users with regards to the second shared content if the existing privileges are not sufficient to perform the requested actions).

Referring now to FIG. 1, a shared content privilege modification system 100 is depicted, according to embodiments. As used herein, a module may be a combination of hardware and software configured to perform a set of operations. System 100 may be a single computer system or may be a combination of computing systems in communication over one or more networks.

System 100 includes a receiving module 110, a privilege determining module 120, a requested action identifying module 130, a privilege modification module 140, an expiration request module 150, and a machine learning module 160. Receiving module 110 may receive an electronic communication containing an address for shared content. Privilege determining module 120 may determine existing privileges with regards to the shared content for the recipients of the electronic communication. Requested action identifying module 130 may identify requested actions in the electronic communication with regards to the shared content. Privilege modification module 140 may modify privileges for recipients when the existing privileges are insufficient to perform the requested actions. Expiration request module 150 may handle requests for privilege modification when a recipient attempts an action after expiration of their modified privileges. Machine learning module 160 may perform machine learning on historical expiration requests to determine appropriate expiration times for modified privileges.

Figure 2:
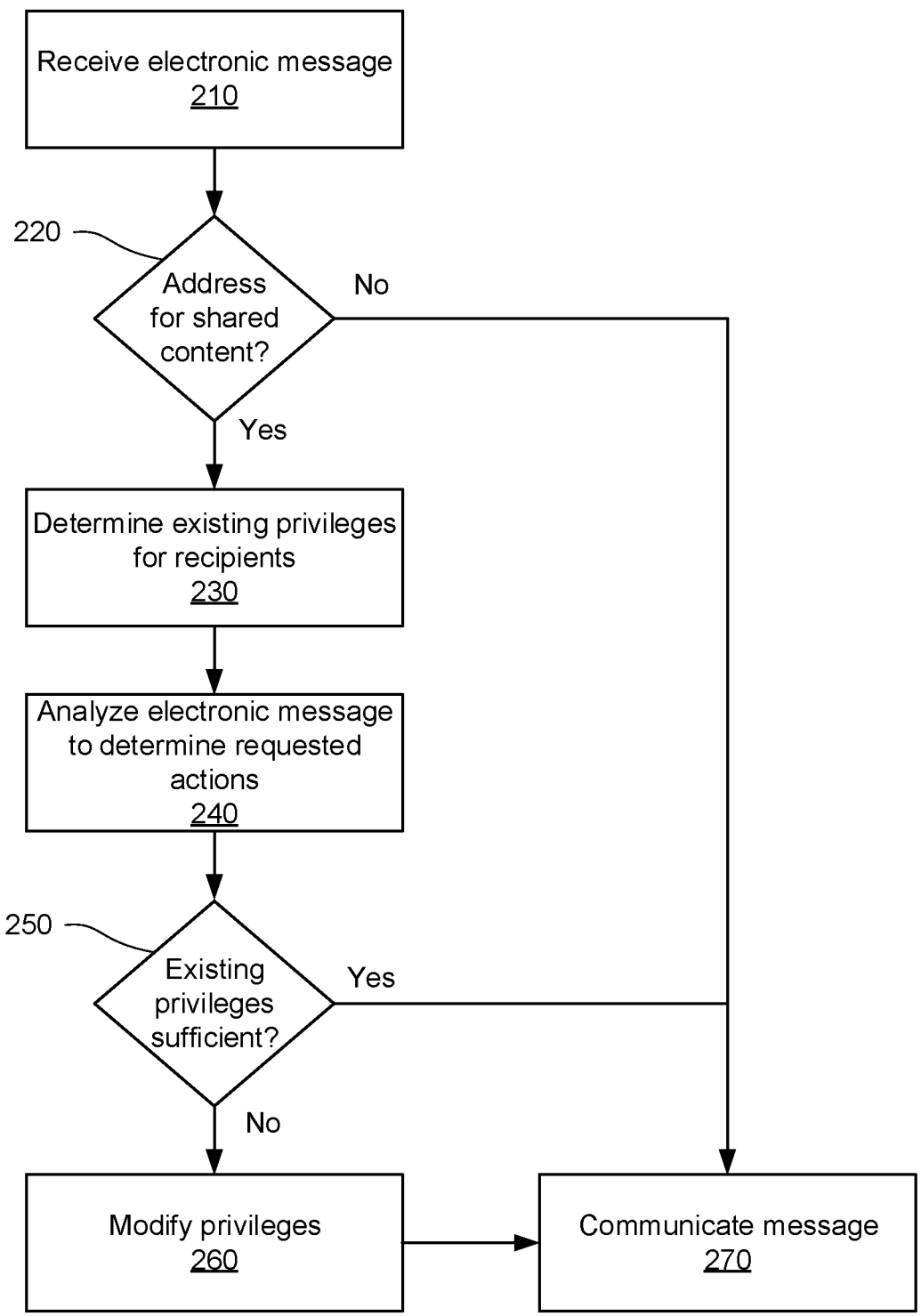
FIG. 2 depicts a flow diagram of a method for privilege modification, according to embodiments.

Referring now to FIG. 2, a flow diagram of a method 200 for privilege modification is depicted, according to embodiments. Method 200 may be performed by a computer system such as computer system 100 depicted in reference to FIG. 1.

At operation 210, an electronic message is received. An electronic message may be received when a sender attempts to communicate a message to a set of recipients.

At operation 220, it is determined whether the electronic message contains an address for accessing shared content. The electronic message may be searched for an address and the address may be analyzed to determine if it is for accessing shared content. For example, the electronic message may be searched for a URL and it may be determined whether the URL is for accessing shared content on a shared content management service. If the electronic message does not contain an address for accessing shared content, the message may be communicated at operation 270.

If the electronic message does contain an address for accessing shared content at operation 220, existing privileges for the recipients are determined for the shared content at operation 230. The permissions list for the shared content may be accessed or requested from the shared content management service.

At operation 240, the electronic message may be analyzed to determine requested actions with regards to the shared content. The electronic message may be analyzed using NLP to identify actions requested of the recipients. In some embodiments, when an action requested of the recipient is not identified, it is assumed that the recipients still need read access. In some embodiments, the electronic message is not analyzed to identify a requested action. In these embodiments, the action requested of the recipient may preconfigured. For example, the system may be configured to determine that the recipients need read access for the shared content without analyzing the message to find a specific request to view the shared content.

At operation 250, it is determined whether the existing privileges for each recipient of the electronic message are sufficient for the recipient to perform the requested actions. If the existing privileges are sufficient for each of the recipients, the electronic message may be communicated at operation 270.

If the existing privileges are not sufficient for one or more recipients of the message at operation 250, the privileges for the one or more recipients may be modified at operation 260. In some embodiments, the privileges may be directly modified. In other embodiments, a request may be made to the shared content management service or an owner of the shared content to modify the privileges. After, the privileges are modified, the electronic message may be communicated at operation 270.

Figure 3:
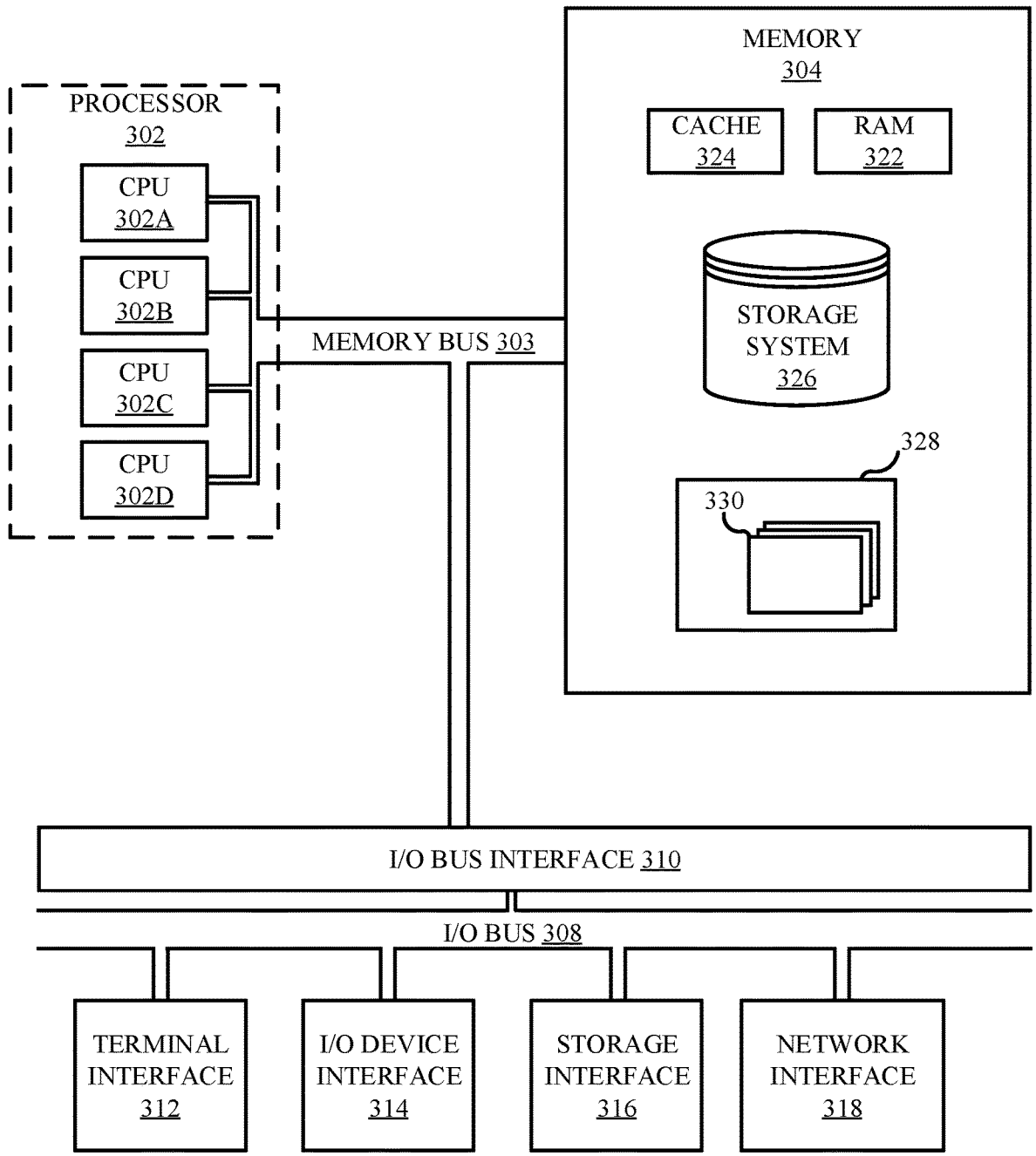
FIG. 3 depicts a high-level block diagram of an example computer system, according to embodiments.

Referring now to FIG. 3, shown is a high-level block diagram of an example computer system 301 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 301 may comprise one or more CPUs 302, a memory subsystem 304, a terminal interface 312, a storage interface 316, an I/O (Input/Output) device interface 314, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302A, 302B, 302C, and 302D, herein generically referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 330 generally perform the functions or methodologies of various embodiments.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   identifying an electronic message containing an address for accessing shared content, the message for communication to a set of recipients;
   determining existing privileges for the shared content for each recipient in the set of recipients;
   determining, by analyzing the message, a requested action of the set of recipients in the message regarding the shared content;
   determining a period of time identified in the message, wherein the determining the period of time comprises determining, by analyzing the message using natural language processing, an end time for the requested action; and
   modifying, for at least one recipient in the set of recipients, privileges for the shared content, for the period of time, based on the existing privileges for the at least one recipient being insufficient to perform the requested action, wherein the modifying privileges for the shared content includes scheduling, based on the end time, modification of the privileges for the at least one recipient back to the existing privileges.

2. The method of claim 1, wherein the determining the requested action regarding the shared content includes analyzing the message using natural language processing.

3. The method of claim 1, wherein the determining the period of time comprises:
   determining a start time for the requested action, and wherein the modifying privileges for the shared content includes scheduling a change in privileges based on the start time.

4. The method of claim 1, further comprising:
   identifying a second message containing a second address for accessing a second shared content, the second message for communication to a second set of recipients;
   determining second existing privileges for the second shared content for each recipient in the second set of recipients;
   determining, by analyzing the second message using natural language processing, a second requested action regarding the second shared content;
   determining that a sender of the second message does not have permission to modify privileges for the second shared content; and
   sending a request to modify privileges for the second shared content to a user with permission to modify privileges for the second shared content based on the second existing privileges for at least one recipient in the second set of recipients being insufficient to perform the second requested action.

5. The method of claim 1, further comprising:
   intercepting communication of the message; and
   communicating the message to the set of recipients after modifying privileges for the shared content.

6. The method of claim 1, wherein the shared content is a shared document, the method further comprising:
   identifying a second address for accessing second shared content in the shared document;
   determining second existing privileges for the second shared content for the at least one recipient;
   determining, by analyzing the shared document using natural language processing, a second requested action regarding the second shared content; and
   modifying, for the at least one recipient, privileges for the second shared content based on the second existing privileges for the at least one recipient being insufficient to perform the second requested action.

7. A computer program product comprising one or more computer readable storage media having program instructions embodied therewith, the program instructions executable by a processor to cause the processor to perform operations comprising:
   identifying an electronic message containing an address for accessing shared content, the message for communication to a set of recipients;

determining, by analyzing the message, existing privileges for the shared content for each recipient in the set of recipients;

determining a requested action of the set of recipients in the message regarding the shared content;

determining a period of time identified in the message, wherein the determining the period of time comprises determining, by analyzing the message using natural language processing, an end time for the requested action; and modifying, for at least one recipient in the set of recipients, privileges for the shared content, for the period of time, based on the existing privileges for the at least one recipient being insufficient to perform the requested action, wherein the modifying privileges for the shared content includes scheduling, based on the end time, modification of the privileges for the at least one recipient back to the existing privileges.

8. The computer program product of claim 7, wherein the determining the requested action regarding the shared content includes analyzing the message using natural language processing.

9. The computer program product of claim 7, wherein the determining the period of time comprises:

determining a start time for the requested action, and wherein the modifying privileges for the shared content includes scheduling a change in privileges based on the start time.

10. The computer program product of claim 7, wherein the operations further comprise:

identifying a second message containing a second address for accessing a second shared content, the second message for communication to a second set of recipients;

determining second existing privileges for the second shared content for each recipient in the second set of recipients;

determining, by analyzing the second message using natural language processing, a second requested action regarding the second shared content;

determining that a sender of the second message does not have permission to modify privileges for the second shared content; and sending a request to modify privileges for the second shared content to a user with permission to modify privileges for the second shared content based on the second existing privileges for at least one recipient in the second set of recipients being insufficient to perform the second requested action.

11. The computer program product of claim 7, wherein the operations further comprise:

intercepting communication of the message; and communicating the message to the set of recipients after modifying privileges for the shared content.

12. The computer program product of claim 7, wherein the shared content is a shared document, and wherein the operations further comprise:

identifying a second address for accessing second shared content in the shared document;

determining second existing privileges for the second shared content for the at least one recipient;

determining, by analyzing the shared document using natural language processing, a second requested action regarding the second shared content; and modifying, for the at least one recipient, privileges for the second shared content based on the second existing privileges for the at least one recipient being insufficient to perform the second requested action.

13. A system comprising:

one or more processors; and one or more computer readable storage media storing program instructions executable by the one or more processors to cause the one or more processors to perform operations comprising:

identifying an electronic message containing an address for accessing shared content, the message for communication to a set of recipients;

determining, by analyzing the message, existing privileges for the shared content for each recipient in the set of recipients;

determining a requested action of the set of recipients in the message regarding the shared content;

determining a period of time identified in the message, wherein the determining the period of time comprises determining, by analyzing the message using natural language processing, an end time for the requested action; and modifying, for at least one recipient in the set of recipients, privileges for the shared content, for the period of time, based on the existing privileges for the at least one recipient being insufficient to perform the requested action, wherein the modifying privileges for the shared content includes scheduling, based on the end time, modification of the privileges for the at least one recipient back to the existing privileges.

14. The system of claim 13, wherein the determining the requested action regarding the shared content includes analyzing the message using natural language processing.

15. The system of claim 13, wherein the determining the period of time comprises:

determining a start time for the requested action, and wherein the modifying privileges for the shared content includes scheduling a change in privileges based on the start time.

16. The system of claim 13, wherein the operations further comprise:

identifying a second message containing a second address for accessing a second shared content, the second message for communication to a second set of recipients;

determining second existing privileges for the second shared content for each recipient in the second set of recipients;

determining, by analyzing the second message using natural language processing, a second requested action regarding the second shared content;

determining that a sender of the second message does not have permission to modify privileges for the second shared content; and sending a request to modify privileges for the second shared content to a user with permission to modify privileges for the second shared content based on the second existing privileges for at least one recipient in the second set of recipients being insufficient to perform the second requested action.

17. The system of claim 13, wherein the operations further comprise:

intercepting communication of the message; and communicating the message to the set of recipients after modifying privileges for the shared content.

* * * * *